United States Patent
Chen

(10) Patent No.: US 7,388,835 B1
(45) Date of Patent: Jun. 17, 2008

(54) GATEWAY CONFIGURATION FOR CONTROLLING DATA FLOW IN MODEM OVER PACKET NETWORKS

(75) Inventor: Zhihui Chen, Trabuco Canyon, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1159 days.

(21) Appl. No.: 10/247,222

(22) Filed: Sep. 18, 2002

(51) Int. Cl.
*H04L 12/26* (2006.01)
*H04L 12/28* (2006.01)

(52) U.S. Cl. ............... 370/235; 370/401; 370/465
(58) Field of Classification Search .......... None
See application file for complete search history.

(56) References Cited

U.S. PATENT DOCUMENTS

| | | | |
|---|---|---|---|
| 6,483,600 B1 * | 11/2002 | Schuster et al. | 358/1.15 |
| 6,680,952 B1 * | 1/2004 | Berg et al. | 370/467 |
| 6,757,250 B1 * | 6/2004 | Fayad et al. | 370/235.1 |
| 6,850,519 B1 * | 2/2005 | Saito et al. | 370/389 |
| 6,909,708 B1 * | 6/2005 | Krishnaswamy et al. | 370/352 |
| 6,999,432 B2 * | 2/2006 | Zhang et al. | 370/328 |
| 7,164,655 B2 * | 1/2007 | Li | 370/232 |
| 2002/0015387 A1 * | 2/2002 | Houh | 370/250 |
| 2002/0064137 A1 * | 5/2002 | Garakani et al. | 370/278 |
| 2003/0133144 A1 * | 7/2003 | Kurtz | 709/230 |

* cited by examiner

*Primary Examiner*—Andrew Lee
(74) *Attorney, Agent, or Firm*—Farjami & Farjami LLP

(57) ABSTRACT

An apparatus and method for configuring a gateway device for a modem over packet network session is disclosed. The method for configuring the first gateway device generally comprises: negotiating with a first client device to establish a first link; receiving, from a second gateway device, data indicative of a second link establish between the second gateway device and a second client device; and configuring the first gateway device to transmit data received from the first client device to the second gateway device using a reliable transport and to receive data from the second gateway device using an unreliable transport if the first link is established with error correction and the second link is established without error correction. In some embodiments the error correction provides flow control between the first gateway device and the first client device. The error correction may be based on MNP or V.42 error correction protocol.

20 Claims, 5 Drawing Sheets

GATEWAY CONFIGURATION FOR CONTROLLING DATA FLOW IN MODEM OVER PACKET NETWORKS

BACKGROUND OF THE INVENTION

1. Field of the Invention

The present invention relates generally to communications over packet networks. More particularly, the present invention relates to the configuration of gateway devices for controlling data flow while communicating over a packet network, such as the Internet, utilizing the Internet Protocol ("IP").

2. Related Art

In recent years, packet-based networks, such as the Internet, have begun to replace the traditional switched telephone networks for transportation of voice and data. For example, with the emergence of voice over IP ("VoIP"), telephone conversations may now be captured, packetized and transported over the Internet. In a conventional VoIP system, telephone conversations or analog voice may be transported over the local loop or the public switch telephone network ("PSTN") to the central office ("CO"). From the CO, the analog voice is transported to a gateway device at the edge of the packet-based network. The gateway device converts the analog voice or speech to packetized data using a codec (coder/decoder), according to one of various existing protocols, such as G.729, G.711, G.723.1, etc. Next, the packetized data is transmitted over the Internet using the Internet Protocol for reception by a remote gateway device and conversion back to analog voice.

Today, many have diverted their focus to using the existing packet-based network and gateway devices, which have been designed to support the transportation of analog voice or speech over IP, to further support modem communication over IP, or as it is referred to in the industry, Modem over Internet Protocol ("MoIP"). FIG. 1 illustrates a block diagram of a conventional communication model for MoIP based on a packet-based network, such as the Internet. As shown, communication model 100 includes first client communication device 110 in communication with first gateway communication device 120 over PSTN providing transmit and receive channels 112 and 114. Communication model 100 further includes second client communication device 150 in communication with second gateway communication device 140 over PSTN providing transmit and receive channels 144 and 142. Communication model 100 enables communications between first gateway communication device 120 and second gateway communication device 140 via a packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. It is widely used for real-time voice and video transmissions where erroneous packets are not retransmitted. Another transport protocol recently advanced for use with MoIP is Simple Packet Relay Transport ("SPRT") which provides a plurality of communication channels, some of which are defined as "unreliable" (i.e., does not guarantee delivery) and others of which are defined as "reliable" (i.e., guarantees delivery).

For purposes of MoIP, communication devices 110, 120, 140 and 150 are capable of performing modem functions. The term modem stands for modulator-demodulator (i.e. digital-to-analog/analog-to-digital converter). Modem is a device that is capable of adapting a terminal or computer to an analog telephone line by converting digital pulses to audio frequencies and vice versa. Modems may support a variety of data modulation standards, such as ITU (International Telecommunications Union) standards: V.22bis, V.34, V.90 or V.92, etc. Communication devices 110, 120, 140 and 150 may also be cable or DSL modems, which are all digital and technically not modems, but referred to as modems in the industry. Typically, modems have built-in error correction, such as MNP2-4 or LAPM (or V.42) and data compression, such as MNP5, V.42bis or V.44. Modems are also capable of supporting various voice and facsimile standards.

Conventionally, the communication process for MoIP begins when first client modem (("M1") or first client communication device 110) calls first gateway modem (("G1") or first gateway communication device 120). As a result, G1 calls second gateway modem (("G2") or second gateway communication device 140), and G2 in turn calls second client modem (("M2") or second client communication device 150). In order to support VoIP in their default mode of operation, typically, G1 and G2 communicate in voice mode and are configured to use a compressed voice protocol, such as the ITU standard G.723.1. However, when M2 answers the incoming call from G2, M2 generates an answer tone, e.g. 2100 Hz, that causes G1 and G2 to switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the tones generated by M2 may propagate through G1 and G2 in a more intact manner in order to reach M1 at the other side.

One existing method provides for maintaining G1 and G2 in G.711 or modem pass through mode, such that M1 and M2 are able to handshake over packet network 130 and transfer data using G.711 packets using the Internet Protocol. However, such solution suffers from many problems, such as packet loss, jitter and delay, which cannot be tolerated by high-speed modems. To overcome such problems, modem connections are terminated locally such that M1 and G1 handshake and make a connection locally to establish a M1-G1 connection link. Similarly, M2 and G2 handshake and make a connection locally to establish a M2-G2 connection link. After the connection links between M1-G1 and M2-G2 are established, data transmitted by M1 is relayed by G1 to G2 over packet network 130 for transmission to M2. Likewise, data transmitted by M2 is relayed by G2 to G1 over packet network 130 for transmission to M1.

Depending on the type of connection link established between M1 and G1 on the one hand and M2 and G2 on the other, certain problems may arise that can affect the modem relay operation. For example, if both the M1-G1 connection link and the M2-G2 connection link are established with error correction, then the connection between G1 and G2 are generally configured with error correction, and relay of data between M1 and M2 is generally not problematic. By way of illustration, consider the case where the connection links between M1-G1 and M2-G2 are established with an error correction protocol that provides flow control, such as V.42 or MNP4. In this case, the G1-G2 connection is configured using a reliable transport. When data is transmitted by M1 to G1 using the error correction protocol, the data is received into G1's data buffer. Data from G1's data buffer is then transferred to G1's error correction buffer; data from the G1's error correction buffer is then transmitted to G2 over the reliable transport. In a similar way, data transmitted by G1 is received into G2's data buffer. Data from G2's data buffer is then transferred to G2's error correction buffer; data from the G2's error correction buffer is then transmitted to M2 using the error correction protocol. Since the G2-M2 link provides error correction, G2 maintains data transmitted to M2 in its error correction buffer until an acknowledgement from M2 confirming receipt of the transferred data. Once acknowledged, data is removed from the error correction buffer, and additional data from the data buffer is transferred to the error correction buffer for transmission, thus clearing the data buffer to receive additional data. On the other hand, if an acknowledgement is not received, the data remains in G2's error correction buffer and is retransmitted by G2 to M2 until acknowledgement from M2 is received. In such situations where retransmission by G2 is required, G2's data buffer continues to receive data transmitted by G1 from M1. Since G2's error correction buffer is not being cleared during retransmission, G2's data buffer is likewise not being cleared during retransmission and continues to accumulate data transmitted from G1. When a certain threshold level in G2's data buffer is reached, G2 transmits a request or notification to G1 to stop data flow (e.g., a "flow off" request). G1 receives G2's stop data flow request, and stops transferring data from its error correction buffer to G2. During this stop data transfer phase, G1's error correction buffer is not being cleared, and therefore G1's data buffer continues to accumulate data received from M1. When a certain threshold level in G1's data buffer is reached, G1 transmits a request or notification to M1 to stop data flow (e.g., a receiver not ready (RNR)). M1 receives the stop data flow request and stops the data transfer to G1. Once G2 is able to successfully transmit to M1, G2's error correction buffer is cleared and replaced with data from G2's data buffer. After G2's data buffer falls below a certain threshold, G2 transmits a request or notification to G1 to resume data flow (e.g., a "flow on" command). G1 receives G2's resume data flow request, and resumes data transfer from its error correction buffer, resulting in G1's error correction buffer and data buffer being cleared. After G1's data buffer falls below a certain threshold, G1 transmits a request or notification to M1 to resume data flow (e.g., a receive reader (RR)). M1 receives G1's resume data flow request, and resumes data transfer to G1. As illustrated in the above sequence, the ability of G2 and G1 to stop the flow of transferred data from a sender prevents buffer overflow and loss of data for transmission from M1 to M2. The same level of buffer overflow and data loss protection is provided for data transmission from M2 to M1.

However, where one of the connection links between M1-G1 and M2-G2 are established without error correction, modem relay operation and performance can present problems. For example, in the case where the M1-G1 connection link is established without error correction and the M2-G2 connection link is established with error correction (e.g., V.42 or MNP4), G1 and G2 may be configured to communicate over packet network 130 using error correction (such as a reliable transport). This configuration allows G2 to control the flow of data transmitted by G1 to G2 (e.g., by communicating a stop data flow request or notification to avoid data buffer overflow). In response to this command, G1 stops data transfer to G2. In this situation, G1 is unable to clear its error-correction buffer, and therefore its data buffer continues to accumulate data received from M1. However, data transmitted by M1 to G1 cannot be flow controlled by G1 (since G1 is not able to communicate a stop data flow request or notification to M1), because the M1-G1 connection link is established without error correction. As a result, G1's data buffer becomes susceptible to overflow, which results in data loss between the M1-G1 link.

In order to remedy this problem, one proposal has been to configure G1 and G2 to use an unreliable transport protocol or channel in both directions if either one of the G1-M1 and G2-M2 connection links is established without error correction or flow control capability. However, such proposal introduces a significant drawback in that an unreliable protocol makes data transfer over packet network 130 extremely susceptible to network impairments of packet network 130, such as packet loss, jitter and delay, which will still result in loss of data in both directions, i.e. from M1 to M2 and from M2 to M1. Various embodiments of the present invention, as disclosed below, describe methods and devices, which can remedy the shortcomings of such proposal.

SUMMARY OF THE INVENTION

In accordance with the purposes of the present invention, as broadly described herein, there is provided an apparatus and method for configuring a gateway device for a modem over packet network session. According to one embodiment, a first gateway device is communicatively coupled to a first client device and a second gateway device. The second gateway device is communicatively coupled to a second client device. The first and second gateway devices are communicatively coupled to each other over a packet network, such as the Internet, for example.

In accordance with one embodiment of the invention, the first gateway device comprises a controller coupled to a receiver and a transmitter. The controller negotiates with the first client device to establish a first link. The receiver receives, from the second gateway device, data indicative of a second link established between the second gateway device and the second client device. The transmitter is then configured to transmit data received from the first client device to the second gateway device using a reliable transport and to receive data from the second gateway device using an unreliable transport if the first link is established with error correction and the second link is established without error correction.

In accordance with another embodiment of the invention, the method for configuring the first gateway device comprises: negotiating with the first client device to establish a first link; receiving, from the second gateway device, data indicative of a second link establish between the second gateway device and the second client device; and configuring the first gateway device to transmit data received from the first client device to the second gateway device using a reliable transport and to receive data from the second gateway using an unreliable transport if the first link is established with error correction and the second link is established without error correction.

According to one embodiment of the invention, the error correction provides flow control between the first gateway device and the first client device. The error correction may be based on MNP or V.42 error correction protocol.

These and other aspects of the invention will become apparent with further reference to the drawings and specification, which follow. It is intended that all such additional system, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing actions. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other communication networks and is not limited to modem over IP. Indeed, for the sake of brevity, conventional data transmission, compression/decompression, error-correction, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
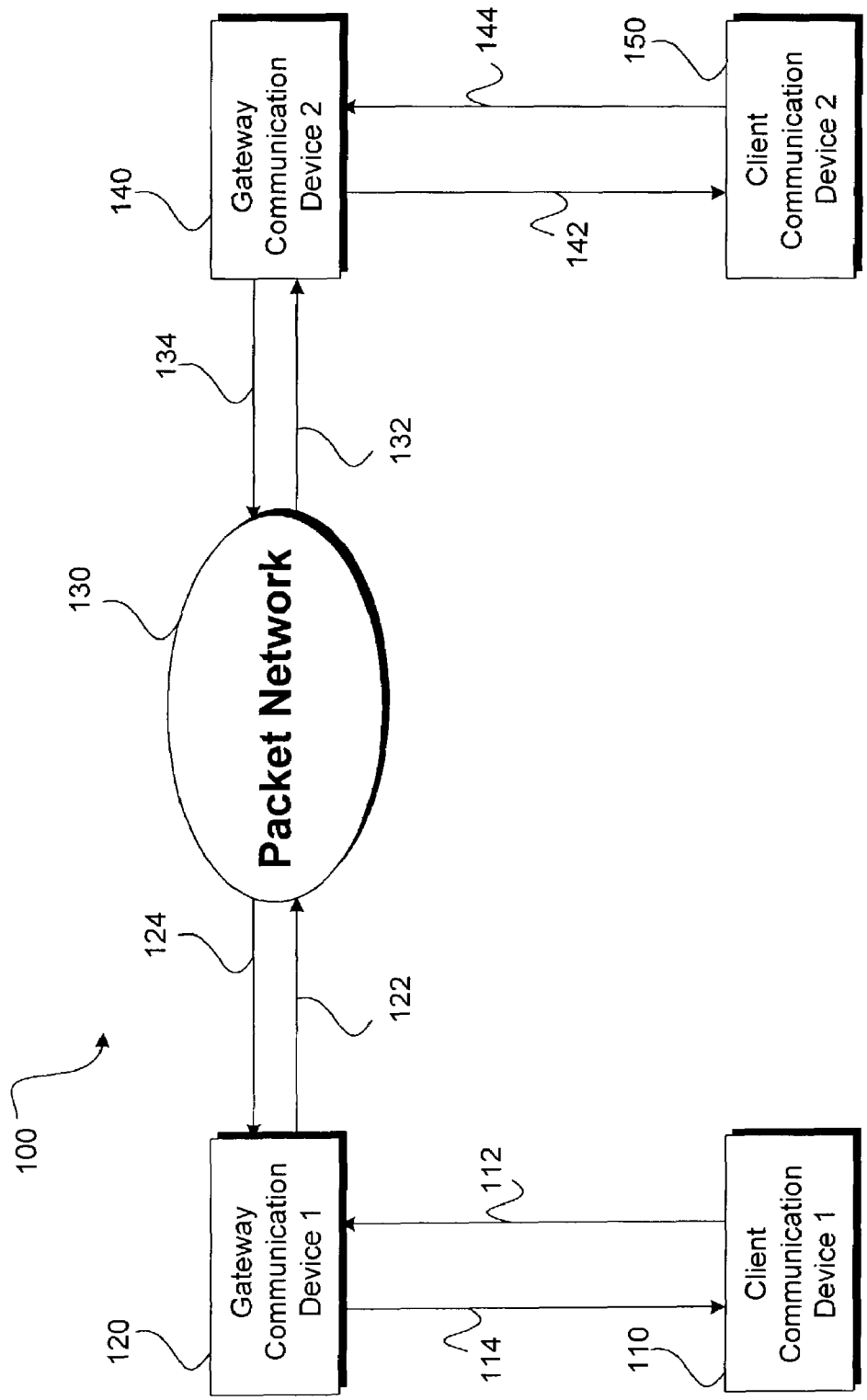
FIG. 1 depicts a block diagram of a prior art communication model based on a packet network, such as the Internet, utilizing the Internet Protocol.
Figures 1, 2:
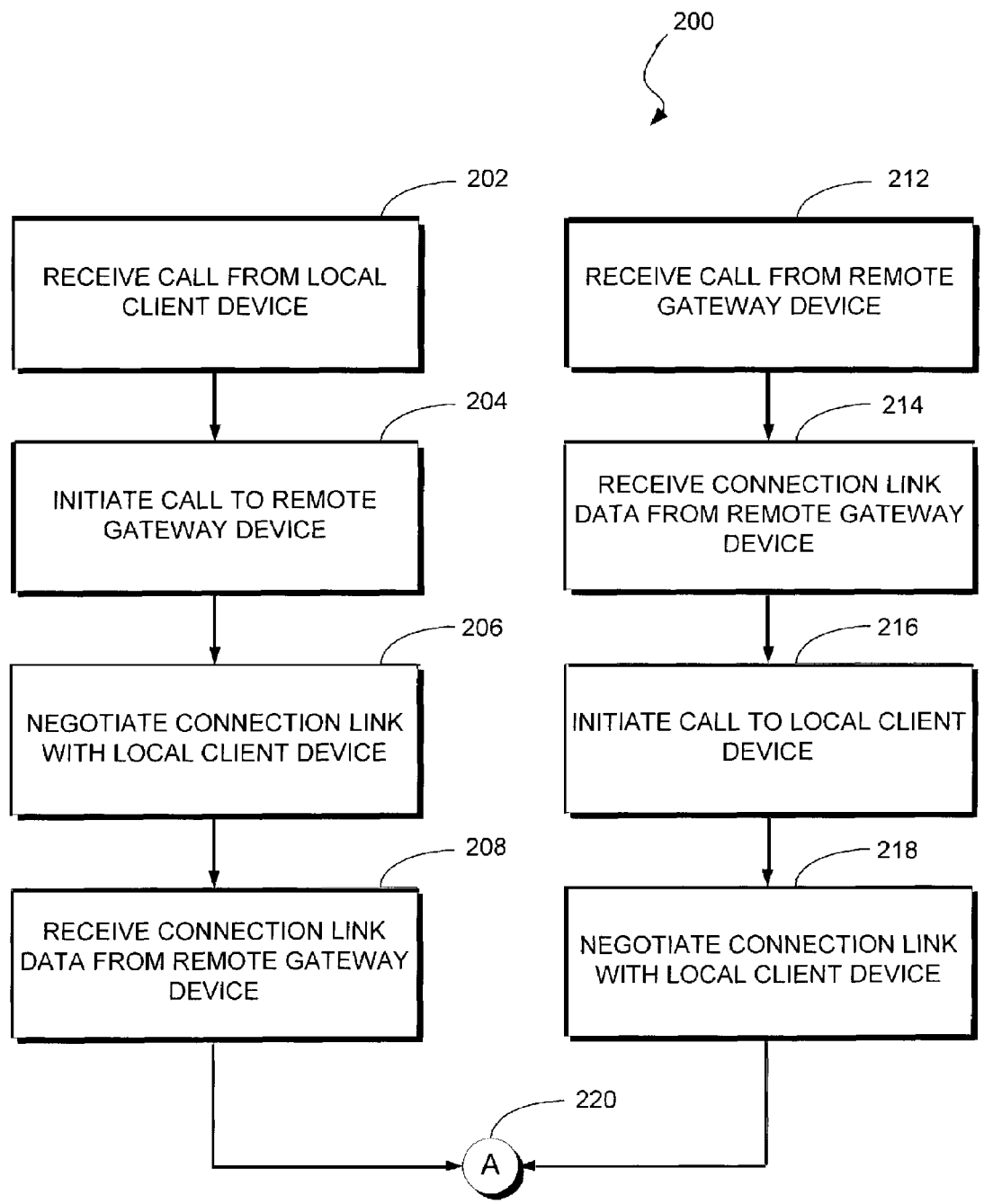
FIG. 2 depicts a logical flow diagram of an error correction selection algorithm for configuring a gateway modem, according to one embodiment of the present invention.
Figure 2:
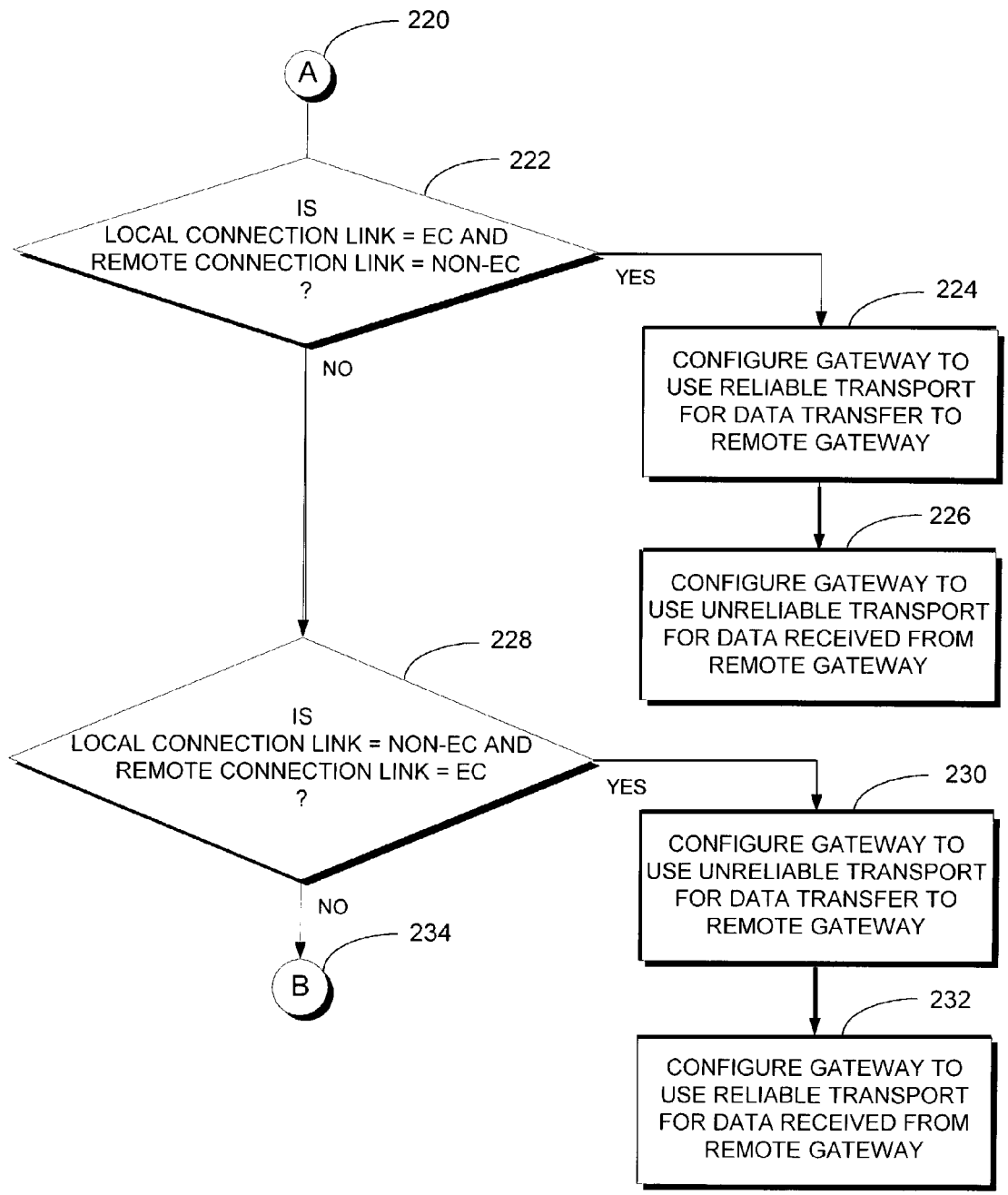

Referring now to FIG. 2, as well as FIG. 1, a logical flow diagram 200 of an error correction selection (hereinafter "ECS") algorithm for configuring a gateway modem for MoIP operation, according to one embodiment of the present invention is generally shown. With reference to FIG. 1, ECS algorithm 200 may be used to configure gateway modem ("G1") 120, which is communicably coupled to the calling or initiating client modem ("M1") 110, in which case process blocks 202 through 208 are carried out to configure G1 120. ECS algorithm 200 may also be used to configure gateway modem ("G2") 140 which is communicably coupled to the answering or destination client modem ("M2") 150, in which case process blocks 212 through 218 are carried out to configure G2 140.

The process associated with configuring G1 120 will first be described in accordance with ECS algorithm 200. At block 202, G1 120 first receives a call from its local modem (or M1 110) over a communication line, such as a telephone line. In response, at block 204, G1 120 calls or contacts G2 140 over packet network 130. As a result, G2 140 calls or contacts second M2 150 over a communication line, such as a telephone line.

At block 206, G1 120 negotiates (or handshakes) with M1 110 to establish a connection (or physical) link between G1 120 and M1 110. Generally, during this process, G1 120 and M1 110 negotiate a communication protocol, such as V.32, V.34, V.90, V.91 or V.92, for data communication between G1 120 and M1 110. In addition, G1 120 and M1 110 may also negotiate to establish error correction (or logical) link, such as MNP2-4 or LAPM (or V.42) and data compression, such as MNP5, V.42bis or V.44.

At block 208, G1 120 receives data indicative of a remote connection link established between G2 140 and M2 150. This remote connection link is established pursuant to negotiations carried out between G2 140 and M2 150 in a manner similar to that described above between G1 120 and M1 110. Among other things, this remote connection link data indicates the error correction algorithm, if any, established between G2 140 and M2 150. ECS algorithm 200 then continues to decision block 222 (as shown via connector "A" 220).

At decision block 222, a determination is made as to whether the local connection link (i.e., the connection link established between G1 120 and M1 110) is established with error correction ("EC") and as to whether the remote connection link (i.e., the connection link established between G2 140 and M2 150) is established without error correction ("NON-EC"). If both conditions are satisfied, ECS algorithm 200 continues to block 224; otherwise, ECS algorithm 200 continues to decision block 228.

At block 224, G1 120 is configured to use a reliable transport for transferring data from G1 120 to G2 140 over packet network 130. The reliable transport may comprise a reliable communication protocol (e.g., TCP transport protocol) or a reliable communication channel (e.g., SPRT transport protocol using a reliable channel). With this configuration, packets received by G1 120 from M1 110 are communicated to G2 140 using a reliable transport, thereby making the M1 110 to M2 150 link more resistant to network impairments of packet network 130, thereby providing more robust modem relay performance in the M1 110 to M2 150 direction and improved data transfer performance.

Block 226 is then carried out wherein G1 120 is configured to receive data from G2 140 using an unreliable communication protocol (e.g., UDP transport protocol) or an unreliable communication channel (e.g., SPRT transport protocol using an unreliable channel). An unreliable transport is used for data communicated from G2 140 to G1 120 to avoid buffer overflow problems at G2 140 for data being received from M2 as described above.

At decision block 228, it is next determined whether the connection link established between G1 120 and M1 110 is established without error correction ("NON-EC") and whether the remote connection link (i.e., the connection link established between G2 140 and M2 150) is established with error correction ("EC"). If both conditions are satisfied, ECS algorithm 200 continues to block 230; otherwise, ECS algorithm 200 continues to decision block 236 (as shown via connector "B" 234).

At block 230, G1 120 is configured to transfer data from G1 120 to G2 140 over packet network 130 using an unreliable communication protocol (e.g., UDP transport protocol) or an unreliable communication channel (e.g., SPRT transport protocol using an unreliable channel). This configuration is carried out to avoid buffer overflow problems at G1 120 for data being received from M1 as described above.

Block 232 is carried out wherein G1 120 is configured to receive data from G2 140 using a reliable communication protocol (e.g., TCP transport protocol) or a reliable communication channel (e.g., SPRT transport protocol using a reliable channel). A reliable transport is used for data communicated from G2 140 to G1 120, is carried out when gateway 140 is capable of being configured in accordance with the present invention, as described in greater detail below in conjunction with process blocks 212 through 218.

At decision block 236, it is next determined whether the connection link established between G1 120 and M1 110 is established with error correction ("EC") and whether the remote connection link (i.e., the connection link established between G2 140 and M2 150) is established with error correction ("EC"). If both conditions are satisfied, ECS algorithm 200 continues to block 238; otherwise, ECS algorithm 200 continues to block 242. It should be noted that in some embodiments, flow control may be provided separate from and/or without having an error correction protocol established between communication devices, such as G1 120 and M1 110. For example, XON/XOFF may be used between communication devices to control flow of data.

At block 238, G1 120 is configured to transfer data to G2 140 using a reliable communication protocol (e.g., TCP transport protocol) or a reliable communication channel (e.g., SPRT transport protocol using a reliable channel). At block 240, G1 120 is further configured to receive data from G2 140 using a reliable communication protocol (e.g., TCP transport protocol) or a reliable communication channel (e.g., SPRT transport protocol using a reliable channel).

At block 242, both local connection link and remote connection link are established without error correction (NON-EC), and thus G1 120 is configured to transfer data to remote G2 140 over packet network 130 using an unreliable communication protocol (e.g., UDP transport protocol) or an unreliable communication channel (e.g., SPRT transport protocol using an unreliable channel). At block 244, G1 120 is further configured to receive data from G2 140 using an unreliable communication protocol (e.g., UDP transport protocol) or an unreliable communication channel (e.g., SPRT transport protocol using an unreliable channel).

The process associated with configuring G2 140 will now be described in accordance with ECS algorithm 200. In this scenario, M1 110 has initiated a call to G1 120 over a communication line, such as a telephone line; in response, G1 120 calls G2 140 over packet network 130. At block 212, G2 140 receives the call from G1 120.

At block 214, G2 140 receives data indicative of a remote connection link between G1 120 and M1 110. This remote connection link is established pursuant to negotiations, which may be carried out in a similar manner to that described in block 206 above.

At block 216, in response to the call from G1 120 (block 212), G2 140 initiates a call to M2 150 over a communication line, such as a telephone line. In some cases, where M2 150 is operating as a RAS device, the communication line between G2 140 and M2 150 is an always-on connection, such as a T-1 line, DSL line, or ISDN line, for example.

At block 218, G2 140 negotiates with M2 150 to establish a connection link between G2 140 and M2 150 in a manner similar to that described above in conjunction with block 206. The negotiated communication parameters between G2 140 and M2 150 define the "local" connection link with respect to G2 140. ECS algorithm 200 then continues to decision block 222 (as shown via connector "A" 220).

Processing blocks 222 through 244 are then carried out in a manner similar to that described above in conjunction with configuring G1 120, except that the connection link between G2 140 and M2 150 is considered the "local" connection link, the connection link between G1 120 and M1 110 is considered the "remote" connection link, and configuration is carried out with respect to G2 140.

Figure 3:
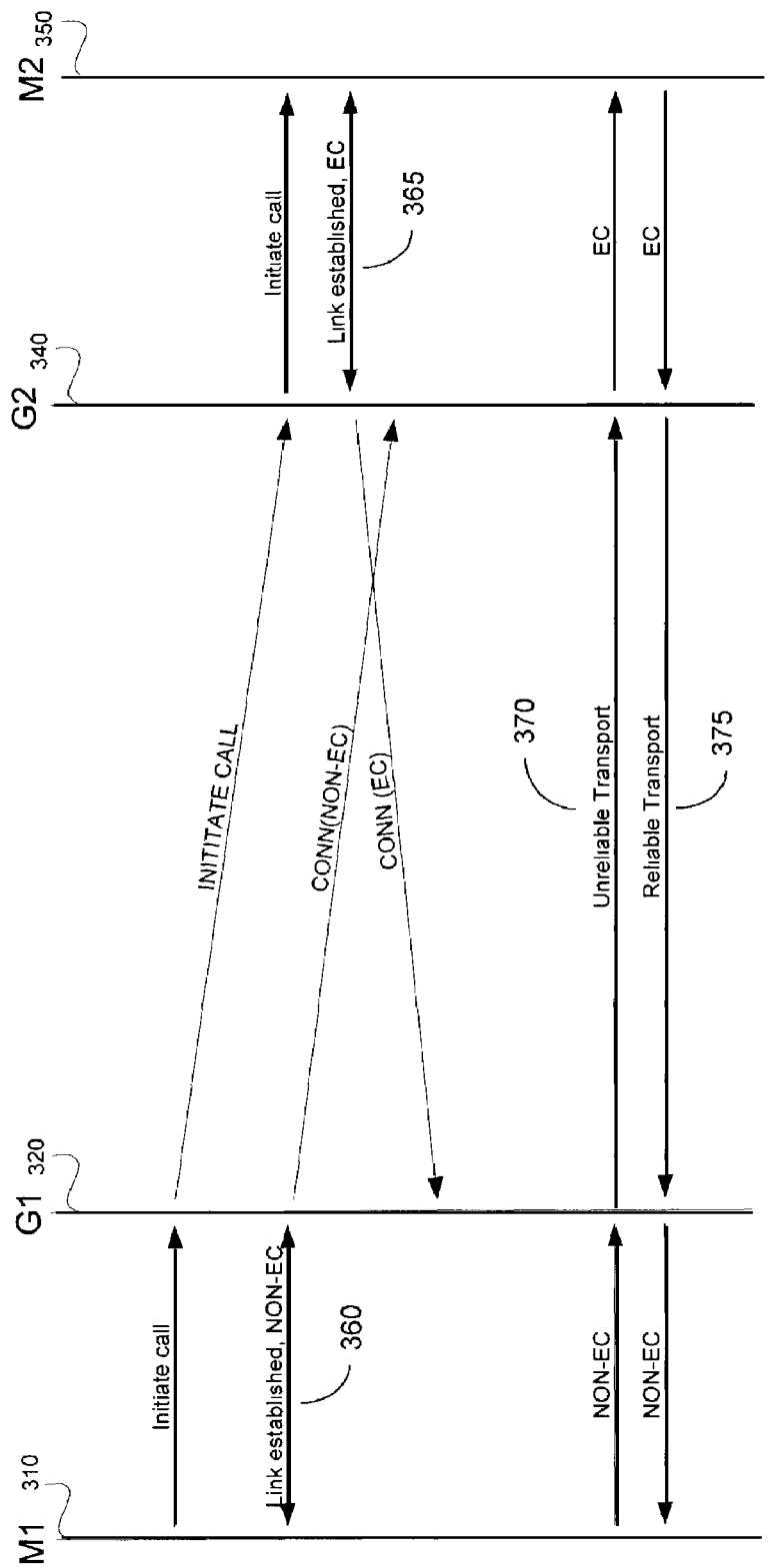
FIG. 3 depicts a block diagram of an illustrative gateway error correction configuration achieved according to the flow chart of FIG. 2.

Referring next to FIG. 3, as well as FIGS. 1 and 2, there is shown a block diagram of an illustrative gateway error correction configuration achieved according to the ECS algorithm 200 of FIG. 2.

First client modem (M1) 310 initiates a call over a communication line, such as a telephone line, to first gateway modem (G1) 320. In response, G1 320 initiates a call to second gateway modem (G2) 340 over packet network 130. G2 340 then calls second client modem (M2) 350 over a communication line.

In the illustrative embodiment of FIG. 3, G1 320 and M1 310 negotiate and establish a first connection link 360 without error correction (NON-EC), and G2 340 and M2 350 negotiate and establish a second connection link 365 with error correction (EC). As shown in FIG. 3, G1 320 transmits a signal to G2 340 communicating data indicative of the first connection link 360. Similarly, G2 340 transmits a signal to G1 320 communicating data indicative of second connection link 365.

With respect to G1 320, at decision block 222 of FIG. 2, ECS algorithm 200 would determine that neither conditions are satisfied: first connection link 360 (local link with respect to G1 320) does not support error correction (NON-EC), and second connection link 365 (remote link with respect to G1 320) does support error correction (EC). At decision block 228, ECS algorithm 200 would determine that both conditions are satisfied: first (local) connection link 360 does not support error correction (NON-EC), and second (remote) connection link 365 does support error correction (EC). Accordingly, G1 320 will be configured in accordance with block 230, where an unreliable transport 370 (e.g., unreliable communication protocol or unreliable protocol channel) is used to transfer data from G1 320 to G2 340. Block 232 is then carried out wherein G1 320 is further configured to receive data from G2 340 using a reliable transport.

With respect to G2 340, at decision block 222, ECS algorithm 200 would determine that both conditions are satisfied: second connection link 365 (local link with respect to G2 340) does support error correction (EC), and first connection link 360 (remote link with respect to G2 340) does not support error correction (NON-EC). Accordingly, G2 340 will be configured in accordance with block 224, where a reliable transport 375 (e.g., reliable communication protocol or reliable protocol channel) is used to transfer data from G2 340 to G1 320. Under this arrangement, data transmitted from M2 350 to M1 310 will be more resistant network impairment over packet network 130 due to reliable transport 375. Block 226 is then carried out, wherein G2 340 is further configured to receive data from G1 320 using an unreliable transport.

In a further illustrative embodiment of FIG. 3 where M1 310 is a dial-up client and M2 350 is a RAS device maintaining an always-on connection to G2 340, the advantages of the present invention are particularly realized by a user of M1 310. Under such an arrangement, packet losses during download (i.e., data transfers from M2 350 to M1 310) due to network impairments of packet network 130 are reduced due to reliable transport 375 utilized for data transfers from G2 340 to G1 320. From a M1 310 user's vantage point, modem relay performance over packet network 130 is substantially similar to that of RAS performance over traditional switched networks.

Figure 4:
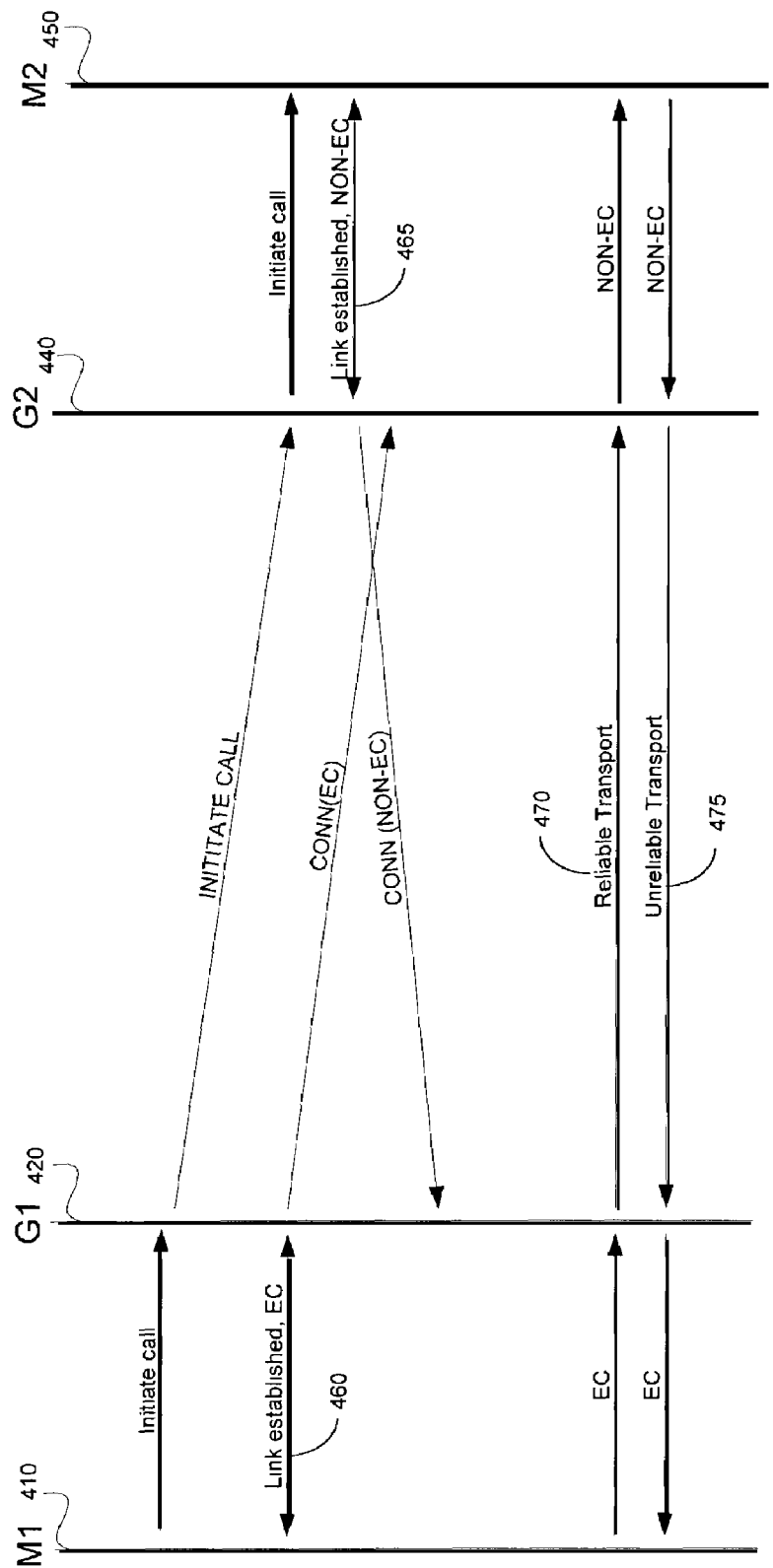
FIG. 4 depicts a block diagram of another illustrative gateway error correction configuration achieved according to the flow chart of FIG. 2.

Referring now to FIG. 4, as well as FIGS. 1 and 2, there is shown a block diagram of another illustrative gateway error correction configuration achieved according to the ECS algorithm 200 of FIG. 2.

First client modem (M1) 410 initiates a call over a communication line, such as a telephone line, to first gateway modem (G1) 420. In response, G1 420 initiates a call to second gateway modem (G2) 440 over packet network 130. G2 440 then calls second client modem (M2) 450 over a communication line.

In the illustrative embodiment of FIG. 4, G1 420 and M1 410 negotiate and establish a first connection link 460 with error correction (EC). G2 440 and M2 450 negotiate and establish a second connection link 465 without error correction (NON-EC). As shown in FIG. 4, G1 420 transmits a signal to G2 440 communicating data indicative of the first connection link 460. Similarly, G2 440 transmits a signal to G1 420 communicating data indicative of second connection link 465.

With respect to G1 420, at decision block 222 of FIG. 2, ECS algorithm 200 would determine that both conditions are satisfied: first connection link 460 (local link with respect to G1 420) does support error correction (EC), and second connection link 465 (remote link with respect to G1 420) does not support error correction (NON-EC). Accordingly, G1 420 will be configured in accordance with block 224, wherein a reliable transport 470 (e.g., reliable communication protocol or reliable protocol channel) is used to transfer data from G1 420 to G2 440. Under this arrangement, data transmitted from M1 410 to M2 450 will be more resistant network impairments of packet network 130. Block 226 may also be carried out, wherein G1 420 is further configured to receive data from G2 440 using an unreliable transport.

With respect to G2 440, at decision block 222, ECS algorithm 200 would determine that neither conditions are satisfied: second connection link 465 (local link with respect to G2 440) does not support error correction (NON-EC), and first connection link 460 (remote link with respect to G2 440) does support error correction (EC). At decision block 228, ECS algorithm 200 would determine that both conditions are satisfied: second (local) connection link 465 does not support error correction (NON-EC), and first (remote) connection link 460 does support error correction (EC). Accordingly, G2 440 will be configured in accordance with block 230, where an unreliable transport 475 (e.g., unreliable communication protocol or unreliable protocol channel) is used to transfer data from G2 440 to G1 420. Block 232 may also be carried out, wherein G2 440 is further configured to receive data from G1 420 using a reliable transport.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. It will be appreciated that the apparatus may vary as to configuration and as to details of the parts, and that the method may vary as to details and the order of the acts, without departing from the basic concepts as disclosed herein. The described embodiments are to be considered in all respects only as illustrative and not restrictive.

What is claimed is:

1. A method for configuring a first gateway device, said first gateway device communicatively coupled to a first client device over a communication line and to a second gateway device over a packet network, said second gateway device communicatively coupled to a second client device, said method comprising:

negotiating with said first client device to establish a first link;

receiving, from said second gateway device, data indicative of a second link established between said second gateway device and said second client device;

configuring said first gateway device to transmit data from said first client device to said second gateway device using a reliable transport if said first link is established with error correction and regardless of whether the second link is established with or without error correction; and configuring said first gateway device to receive data from said second gateway device using an unreliable transport if said second link is established without error correction and regardless of whether the first link is established with or without error correction.

2. The method of claim 1, wherein said error correction provides flow control between said first gateway device and said first client device.

3. The method of claim 1, wherein said reliable transport provides flow control between said first gateway device and said second gateway device.

4. The method of claim 1, wherein said first and second client devices are configured to provide modem functions.

5. The method of claim 1, wherein said error correction is based on V.42 protocol.

6. The method of claim 1, wherein said error correction is based on MNP protocol.

7. A first gateway device, said first gateway device communicatively coupled to a first client device over a communication link and a second gateway device over a packet network, said second gateway device communicatively coupled to a second client device, said first gateway device comprising:

a controller configured to negotiate with said first client device to establish a first link;

a receiver coupled to said controller and configured to receive, from said second gateway device, data indicative of a second link established between said second gateway device and said second client device; and a transmitter coupled to said controller and configured to transmit data from said first client device to said second gateway device using a reliable transport if said first link is established with error correction and regardless of whether the second link is established with or without error correction;

wherein said receiver is configured to receive data from said second gateway device using an unreliable transport if said second link is established without error correction and regardless of whether the first link is established with or without error correction.

8. The first gateway device of claim 7, wherein said error correction provides flow control between said first gateway device and said first client.

9. The first gateway device of claim 7, wherein said reliable transport provides flow control between said first gateway device and said second gateway device.

10. The first gateway device of claim 7, wherein said error correction is based on V.42 protocol.

11. The first gateway device of claim 7, wherein said error correction is based on MNP protocol.

12. A method for configuring a first gateway device, said first gateway device communicatively coupled to a first client device over a communication line and to a second gateway device over a packet network, said second gateway device communicatively coupled to a second client device, said method comprising:

negotiating with said first client device to establish a first link;

receiving, from said second gateway device, data indicative of a second link established between said second gateway device and said second client device;

configuring said first gateway device to transmit data from said first client device to said second gateway device using an unreliable transport if said first link is established without error correction and regardless of whether the second link is established with or without error correction; and configuring said first gateway device to receive data from said second gateway using a reliable transport if said second link is established with error correction and regardless of whether the first link is established with or without error correction.

13. The method of claim 12, wherein said error correction provides flow control between said second gateway device and said second client device.

14. The method of claim 12, wherein said error correction is based on V.42 protocol.

15. The method of claim 12, wherein said error correction is based on MNP protocol.

16. The method of claim 12, wherein said first and second client device are configured to provide modem functions.

17. A method for configuring a first gateway device, said first gateway device communicatively coupled to a first client device over a communication line and to a second gateway device over a packet network, said second gateway device communicatively coupled to a second client device, said method comprising:

negotiating with said first client device to establish a first link;

receiving, from said second gateway device, data indicative of a second link established between said second gateway device and said second client device;

configuring said first gateway device to transmit data from said first client device to said second gateway device using a reliable transport if said first link provides a first flow control capability, or to transmit data from said first client device to said second gateway device using an unreliable transport if said first link does not provide said first flow control capability, and regardless of whether the second link does or does not provide a flow control capability; and configuring said first gateway device to receive data from said second gateway device using a reliable transport if said second link provides a second flow control capability, or to receive data from said second gateway device using an unreliable transport if said second link does not provide said second flow control capability, and regardless of whether the first link does or does not provide a flow control capability.

18. The method of claim 17, wherein said first flow control capability is provided by V.42 protocol.

19. The method of claim 17, wherein said first flow control capability is provided by MNP protocol.

20. The method of claim 17, wherein said first flow control capability is provided by XON/XOFF.

* * * * *